United States Patent [19]

Chance et al.

[11] Patent Number: 4,467,436
[45] Date of Patent: Aug. 21, 1984

[54] ROBOT ARM CONTROLLER WITH COMMON BUS MEMORY

[75] Inventors: Peter E. Chance, Rosemont; Mitchell Weiss, Ardmore, both of Pa.

[73] Assignee: United States Robots, Inc., King of Prussia, Pa.

[21] Appl. No.: 314,914

[22] Filed: Oct. 26, 1981

[51] Int. Cl.³ ............ G05B 19/42; G06F 15/46; B25J 9/00
[52] U.S. Cl. ............................. 364/513; 364/200
[58] Field of Search ........................ 364/200, 513

[56] References Cited

U.S. PATENT DOCUMENTS

| | | | |
|---|---|---|---|
| 4,128,881 | 12/1978 | Yamamoto et al. | 364/200 |
| 4,141,067 | 2/1979 | McLagan | 364/200 |
| 4,178,632 | 12/1979 | Anthony | 364/513 |
| 4,237,534 | 12/1980 | Felix | 364/200 |
| 4,263,538 | 4/1981 | Richiardi | 364/513 X |
| 4,308,584 | 12/1981 | Arai | 364/513 |

OTHER PUBLICATIONS

Shima et al.: Z-80 Chip Set Heralds Third Microprocessor Generation, Electronics Magazine Book Series-McGraw Hill, 1976, pp. 44-48, TK7895.M5.
Morris et al.: Scamp Microprocessor Aims to Replace Mechanical Logic, Electronics, Sep. 18, 1975, pp. 81/87.
Titus: Data-Aquisition System Built Modularly Around Intel 8080, Electronics Magazine Book Series, McGraw Hill, 1976, pp. 188-190.

Primary Examiner—Felix D. Gruber
Attorney, Agent, or Firm—Caesar, Rivise, Bernstein & Cohen, Ltd.

[57] ABSTRACT

In a robotic apparatus having a manipulator arm including plural motors to move the arm to predetermined spatial positions and a control system for the arm, a common bus and common memory connected to the bus. The control system comprises respective microprocessor based controllers for each of the joints, microprocessor based computation means for performing the mathematical computation to control the trajectories of the arm and common microprocessor based co-ordinating control system for coordinating the activities of the other modular microprocessor based control system. Accessing routine is associated with the bus for providing each of the microprocessor based control system with direct, exclusive access to the bus during respective time intervals. The common memory serves as a depository for messages to and from the microprocessor based control system to enable intercommunication between the microprocessor based control system accessing the bus.

12 Claims, 7 Drawing Figures

| Address Locations (Hexadecimal Code) | A15 ADE | A14 ADD | A13 ADC | A12 ADB | A11 ADA | NC DO8 | SO DO7 | S1/INTIO DO6 | MEMRQ DO5 | IORQ DO4 | DO3 | CI ROM 167 DO2 | CO ROM 166 DO1 |
|---|---|---|---|---|---|---|---|---|---|---|---|---|---|
|  | INPUTS (BINARY) | | | | | OUTPUTS (BINARY) | | | | | | | |
| 0000 | 0 | 0 | 0 | 0 | 0 | 0 | 0 | 1 | 1 | 1 | 1 | 1 | 1 |
| 0800 | 0 | 0 | 0 | 0 | 1 | 0 | 1 | 0 | 1 | 1 | 1 | 1 | 1 |
| 1000 | 0 | 0 | 0 | 1 | 0 | 0 | 1 | 1 | 1 | 0 | 1 | 1 | 1 |
| 1800 | 0 | 0 | 0 | 1 | 1 | 0 | 1 | 1 | 1 | 0 | 1 | 1 | 1 |
| 2000 | 0 | 0 | 1 | 0 | 0 | 0 | 1 | 1 | 1 | 0 | 1 | 1 | 1 |
| 2800 | 0 | 0 | 1 | 0 | 1 | 0 | 1 | 1 | 1 | 0 | 1 | 1 | 1 |
| 3000 | 0 | 0 | 1 | 1 | 0 | 0 | 1 | 1 | 1 | 0 | 1 | 1 | 1 |
| 3800 | 0 | 0 | 1 | 1 | 1 | 0 | 1 | 1 | 1 | 0 | 1 | 1 | 1 |
| 4000 | 0 | 1 | 0 | 0 | 0 | 0 | 1 | 1 | 1 | 0 | 1 | 1 | 1 |
| 4800 | 0 | 1 | 0 | 0 | 1 | 0 | 1 | 1 | 1 | 0 | 1 | 1 | 1 |
| 5000 | 0 | 1 | 0 | 1 | 0 | 0 | 1 | 1 | 1 | 0 | 1 | 1 | 1 |
| 5800 | 0 | 1 | 0 | 1 | 1 | 0 | 1 | 1 | 1 | 0 | 1 | 1 | 1 |
| 6000 | 0 | 1 | 1 | 0 | 0 | 0 | 1 | 1 | 1 | 0 | 1 | 1 | 1 |
| 6800 | 0 | 1 | 1 | 0 | 1 | 0 | 1 | 1 | 1 | 0 | 1 | 1 | 1 |
| 7000 | 0 | 1 | 1 | 1 | 0 | 0 | 1 | 1 | 1 | 0 | 1 | 1 | 1 |
| 7800 | 0 | 1 | 1 | 1 | 1 | 0 | 1 | 1 | 1 | 0 | 1 | 1 | 1 |
| 8000 | 1 | 0 | 0 | 0 | 0 | 0 | 1 | 1 | 1 | 0 | 1 | 1 | 1 |
| 8800 | 1 | 0 | 0 | 0 | 1 | 0 | 1 | 1 | 1 | 0 | 1 | 1 | 1 |
| 9000 | 1 | 0 | 0 | 1 | 0 | 0 | 1 | 1 | 1 | 0 | 0 | 1 | 1 |
| 9800 | 1 | 0 | 0 | 1 | 1 | 0 | 1 | 1 | 0 | 1 | 1 | 1 | 1 |
| A000 | 1 | 0 | 1 | 0 | 0 | 0 | 1 | 1 | 1 | 0 | 1 | 1 | 1 |
| A800 | 1 | 0 | 1 | 0 | 1 | 0 | 1 | 1 | 1 | 0 | 1 | 1 | 1 |
| B000 | 1 | 0 | 1 | 1 | 0 | 0 | 1 | 1 | 1 | 0 | 1 | 1 | 1 |
| B800 | 1 | 0 | 1 | 1 | 1 | 0 | 1 | 1 | 1 | 0 | 1 | 1 | 1 |
| C000 | 1 | 1 | 0 | 0 | 0 | 0 | 1 | 1 | 1 | 0 | 1 | 1 | 1 |
| C800 | 1 | 1 | 0 | 0 | 1 | 0 | 1 | 1 | 1 | 0 | 1 | 1 | 1 |
| D000 | 1 | 1 | 0 | 1 | 0 | 0 | 1 | 1 | 1 | 0 | 1 | 1 | 1 |
| D800 | 1 | 1 | 0 | 1 | 1 | 0 | 1 | 1 | 1 | 0 | 1 | 1 | 1 |
| E000 | 1 | 1 | 1 | 0 | 0 | 0 | 1 | 1 | 1 | 1 | 1 | SEE FIG. 5A | |
| E800 | 1 | 1 | 1 | 0 | 1 | 0 | 1 | 1 | 1 | 1 | 1 | | |
| F000 | 1 | 1 | 1 | 1 | 0 | 0 | 1 | 1 | 1 | 1 | 1 | | |
| F800 | 1 | 1 | 1 | 1 | 1 | 0 | 1 | 1 | 1 | 1 | 1 | | |

Inputs from U12: BUSRQ̄, BUSAK̄, Φ2 IN, R/W̄, MEMRQ̄
Outputs: Φ2, WE (Φ2), Φ2, WR (Φ2), RO (Φ2), ABENABLE, DBOUT, DBIN

| | ADE | ADD | ADC | ADB | ADA | DO8 | DO7 | DO6 | DO5 | DO4 | DO3 | DO2 | DO1 | |
|---|---|---|---|---|---|---|---|---|---|---|---|---|---|---|
| EXTERNAL MODE | 0 | 0 | 0 | 0 | 0 | 1 | 1 | 0 | 1 | 1 | 0 | 0 | 1 | EXT WRITE SETUP |
| | 0 | 0 | 0 | 0 | 1 | 1 | 1 | 0 | 1 | 1 | 1 | 1 | 1 | |
| | 0 | 0 | 0 | 1 | 0 | 1 | 1 | 0 | 1 | 1 | 0 | 1 | 0 | EXT READ SETUP |
| | 0 | 0 | 0 | 1 | 1 | 1 | 1 | 0 | 1 | 1 | 1 | 1 | 1 | |
| | 0 | 0 | 1 | 0 | 0 | 0 | 1 | 1 | 0 | 1 | 0 | 0 | 1 | EXT WRITE |
| | 0 | 0 | 1 | 0 | 1 | 0 | 0 | 1 | 1 | 1 | 1 | 1 | 1 | INT WRITE |
| | 0 | 0 | 1 | 1 | 0 | 0 | 1 | 1 | 1 | 0 | 0 | 1 | 0 | EXT READ |
| | 0 | 0 | 1 | 1 | 1 | 0 | 1 | 1 | 1 | 1 | 1 | 1 | 1 | |
| INTERNAL MODE A | 0 | 1 | 0 | 0 | 0 | 1 | 1 | 0 | 1 | 1 | 1 | 1 | 1 | |
| | 0 | 1 | 0 | 0 | 1 | 1 | 1 | 0 | 1 | 1 | 1 | 1 | 1 | |
| | 0 | 1 | 0 | 1 | 0 | 1 | 1 | 0 | 1 | 1 | 1 | 1 | 1 | |
| | 0 | 1 | 0 | 1 | 1 | 1 | 1 | 0 | 1 | 1 | 1 | 1 | 1 | |
| | 0 | 1 | 1 | 0 | 0 | 0 | 1 | 1 | 1 | 1 | 1 | 1 | 1 | |
| | 0 | 1 | 1 | 0 | 1 | 0 | 0 | 1 | 1 | 1 | 1 | 1 | 1 | |
| | 0 | 1 | 1 | 1 | 0 | 0 | 1 | 1 | 1 | 1 | 1 | 1 | 1 | |
| | 0 | 1 | 1 | 1 | 1 | 0 | 1 | 1 | 1 | 1 | 1 | 1 | 1 | |
| INTERNAL MODE B | 1 | 0 | 0 | 0 | 0 | 1 | 1 | 0 | 1 | 1 | 1 | 1 | 1 | |
| | 1 | 0 | 0 | 0 | 1 | 1 | 1 | 0 | 1 | 1 | 1 | 1 | 1 | |
| | 1 | 0 | 0 | 1 | 0 | 1 | 1 | 0 | 1 | 1 | 1 | 1 | 1 | |
| | 1 | 0 | 0 | 1 | 1 | 1 | 1 | 0 | 1 | 1 | 1 | 1 | 1 | |
| | 1 | 0 | 1 | 0 | 0 | 0 | 1 | 1 | 1 | 1 | 1 | 1 | 1 | |
| | 1 | 0 | 1 | 0 | 1 | 0 | 0 | 1 | 1 | 1 | 1 | 1 | 1 | |
| | 1 | 0 | 1 | 1 | 0 | 0 | 1 | 1 | 1 | 1 | 1 | 1 | 1 | |
| | 1 | 0 | 1 | 1 | 1 | 0 | 1 | 1 | 1 | 1 | 1 | 1 | 1 | |
| INTERNAL MODE C | 1 | 1 | 0 | 0 | 0 | 1 | 1 | 0 | 1 | 1 | 1 | 1 | 1 | |
| | 1 | 1 | 0 | 0 | 1 | 1 | 1 | 0 | 1 | 1 | 1 | 1 | 1 | |
| | 1 | 1 | 0 | 1 | 0 | 1 | 1 | 0 | 0 | 1 | 1 | 1 | 1 | |
| | 1 | 1 | 0 | 1 | 1 | 0 | 1 | 0 | 0 | 1 | 1 | 1 | 1 | |
| | 1 | 1 | 1 | 0 | 0 | 0 | 1 | 1 | 0 | 1 | 1 | 1 | 1 | |
| | 1 | 1 | 1 | 0 | 1 | 0 | 0 | 1 | 1 | 1 | 1 | 1 | 1 | |
| | 1 | 1 | 1 | 1 | 0 | 0 | 1 | 0 | 1 | 1 | 1 | 1 | 1 | |
| | 1 | 1 | 1 | 1 | 1 | 0 | 0 | 1 | 1 | 1 | 1 | 1 | 1 | |

ROBOT ARM CONTROLLER WITH COMMON BUS MEMORY

BACKGROUND OF THE INVENTION

This invention relates generally to robotic systems, and more particularly to controllers for robot manipulators.

Various robotic system have been disclosed in the patent literature and are commercially available. Such systems frequently include a manipulator arm for supporting a tool at its free end to move the tool to desired spatial positions to accomplish some desired task, e.g., handling parts for assembly operations, machine loading applications, etc.

The manipulator arms used in such systems are frequently jointed so that the tool can be moved to any position within a three-dimensional envelope, commonly referred to as the working envelope of the arm. One common practice is to form the arm of plural joints with interconnecting links so that the arm is arranged to be moved to simulate movements of a human arm. Hence, such arms frequently include a shoulder joint for rotating the arm about a horizontal axis, a wrist joint for rotating the tool holder about a pitch or a roll axis, etc. The actual movement of the joints of the arm is accomplished by motors or other actuators. The operation of the motors is usually accomplished under computer control. In this regard, in state-of-the-art robotic systems, the arms are controlled by computer means which include microprocessors for effecting movement of the arm to various positions within the working volume in accordance with predetermined teachable and repeatable programs. To accomplish such computer control, the joint motors frequently have associated with them encoders to provide signals indicative of joint position. These signals are operated on by mathematical computating means in the system's microprocessors so that the exact position of the tool within the working volume is determined to insure accurate arm positioning when the joint motors are operated to move the arm to another position within the working volume.

While such prior art systems are generally suitable for their intended purposes, the interconnections between the microprocessors of the system's controller provides severe constraints on future growth of the system. In this regard, in some prior art systems in order to add additional processing capabilities, diagnostics, and memory, substantial modification to the circuitry forming the controller is necessary.

OBJECTS OF THE INVENTION

Accordingly, it is a general object of the instant invention to provide a controller for use in a robotic manipulator system which overcomes the disadvantages of the prior art.

It is another object of the instant invention to provide a controller for a robot manipulator arm which is of modular construction to enable a user to readily add capabilities to the system.

It is still a further object of the instant invention to provide in a controller for a robotic manipulator, common bus means for enabling system processors to be provided access to the bus for intercommunication or other operations.

It is still a further object of the instant invention to provide in a controller for a robotic manipulator, which controller includes plural, modular microprocessors for performing various system functions, a common bus and common memory means connected thereto to effect communication between the controller's microprocessors.

It is yet a further object of the instant invention to provide a modular microprocessor based controller for a robotic system, whose processors share a common bus and common memory area and which controller can be readily expanded by the inclusion of other modular components by interconnection on the common bus.

SUMMARY OF THE INVENTION

These and other objects of the instant invention are achieved by providing a robot apparatus comprising a manipulator arm having plural joints and respective motor means associated with said joints to move said manipulator arm to a predetermined spatial position and control means for said arm. The control means comprises respective modular microprocessor based control means for each of the joint motor means for the contol thereof, microprocessor based control means performing the mathematical computations required to control the trajectories of the arm and common microprocessor based coordinating control means for coordinating the activities of the other microprocessor based control means. A common electrical bus and accessing means for the bus are also provided. Each of the microprocessor based control means are connected to the common bus by the accessing means. All of the microprocessor based control means operate in parallel with one another. The accessing means provides each of the microprocessor based control means with direct, exclusive access to the bus during respective time intervals.

Other objects and many of the attendant advantages of this invention will be readily appreciated as the same becomes better understood by reference to the following detailed description when considered in connection with the accompanying drawing wherein:

DETAILED DESCRIPTION OF THE PREFERRED EMBODIMENT

Figure 1:
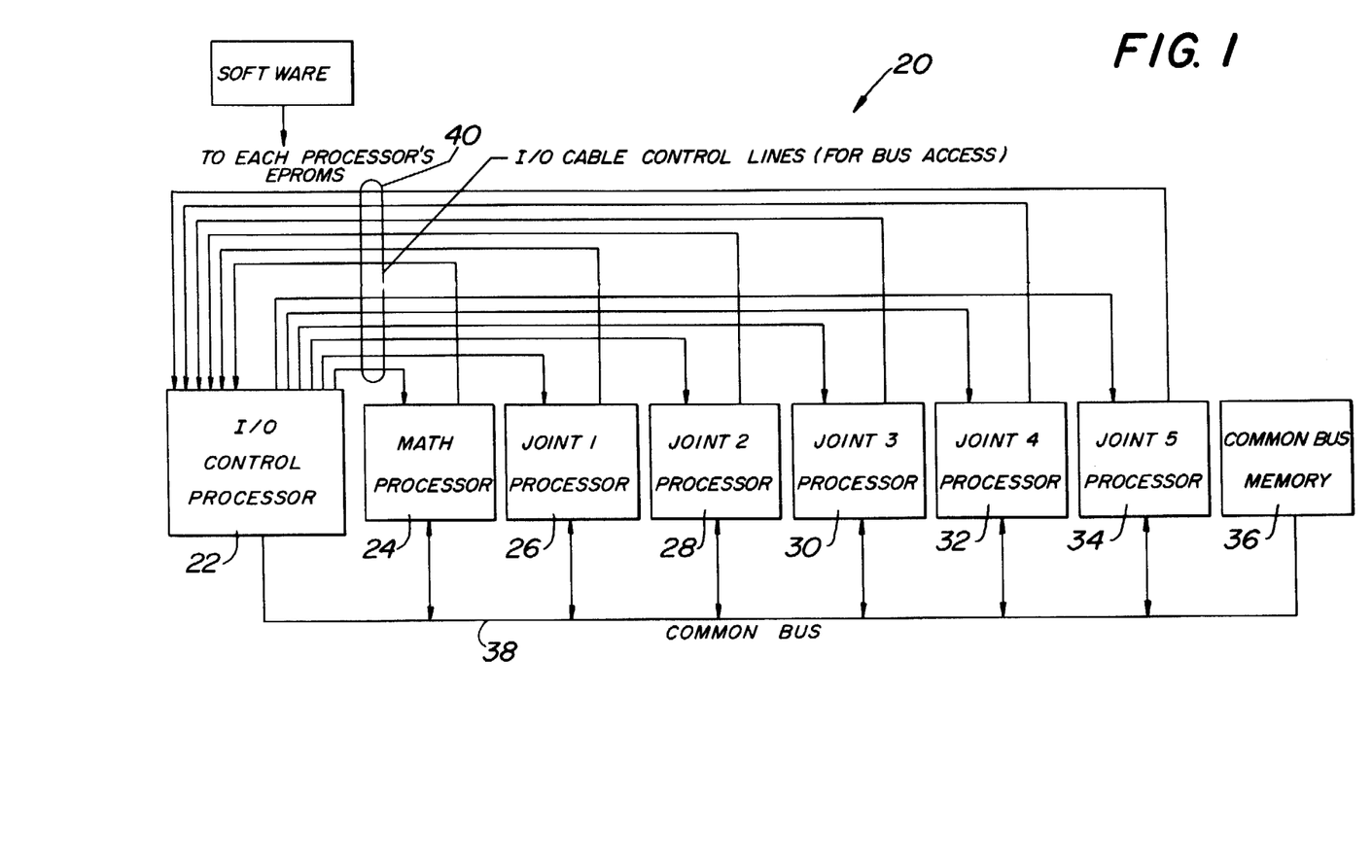
FIG. 1 is a schematic diagram of the controller of the instant invention for use in a robotic manipulator arm system.

Referring now to the various figures of the drawing wherein like reference characters refer to like parts, there is shown generally at 20 in FIG. 1 a contoller for a robotic manipulator arm system like that disclosed and claimed in our co-pending U.S. application Ser. No.

314,156, filed on Oct. 23, 1981, and entitled Robotic Manipulator Arm, which application is assigned to the same assignee as the instant invention, and whose disclosure is incorporated by reference herein.

The robotic system also includes a teach pendant (not shown) and a manipulator arm (not shown). The arm includes various joints and interconnecting links. Each joint includes a closed loop servo system associated therewith for moving the joint to a predetermined position in space.

In the robot arm embodiment disclosed and claimed in our aforementioned patent application, there are five joints, namely, joint 1 (a "base" joint), joint 2 (a "shoulder" joint), joint 3 (an "extension" arm joint), joint 4 (a "wrist pitch" joint) and joint 5 (a "wrist roll" joint).

The controller and the teach pendant include the system's electronics and memory and cooperate to enable the manipulator arm to be taught a program (i.e., one or more positions in space) during a "teach mode". This is accomplished by manually moving the robot arm to desired positions and then depressing a teach switch on the teach pendant to record that position in memory. Once a program is taught, it is in the controller's memory and is thus available for automatic replay or repeat by the arm when called upon to do so.

The teach pendant and controller also cooperate to enable any taught program to be readily edited without necessitating rewriting of the entire program. Thus, the teach pendant includes function editing switches to enable the program to be edited directly by adding points or sub-routines, deleting points, over-writing points, etc.

The controller 20 is the means by which signals are provided to the arm to move the arm to the desired points in space as called for in the program. This function is accomplished by microprocessors in the controller. The arm also includes at each joint an optical shaft encoder, which is a portion of its closed loop servo system. The encoders provide signals which are operated on by the controller's microprocessors to determine the actual spatial position of the arm's joints at any given moment. The controller also includes mathematical computation means for calculating the trajectories of the arm and control means which coordinates the entire operation of the controller.

Thus, as can be seen in FIG. 1, the controller basically comprises an input/output (I/O) control processor 22, a math processor 24, a joint 1 processor 26, a joint 2 processor 28, a joint 3 processor 30, a joint 4 processor 32, a joint 5 processor 34 and a common bus memory 36.

Each of the joint processors 26-34 is arranged to control the movement of an associated joint of the robot arm by controlling the operation of the closed looped servo system's motor. To that end, the joint 1 processor is associated with the base joint servo system, the joint 2 processor is associated with the shoulder joint servo system, the joint 3 processor is associated with the extension arm joint servo system, the joint 4 processor is associated with the wrist pitch joint servo system and the joint 5 processor is associated with the wrist roll joint servo system.

The math processor 24 serves as the means for effecting the various mathematical computations necessary to control the trajectories of the manipulator arm. The I/O control processor 22 serves as the overall controller for the system by coordinating the activities of the other local processors, e.g., joint and math processors, and any peripheral equipment used in the robotic system.

In accordance with the instant invention, each of the processors 22-34 are modular, microprocessors. Those microprocessors, as well as the common bus memory 36 are connected on a common electrical bus 38. This feature enables ready intercommunication between various processors forming the system, while also enabling additional processors or other modular electronic or computer components to be added to the system.

The controller includes an I/O control cable 40 having various conductors which interconnect the various processors of the system to effect the control thereof. Software, in the form of programming, to be set forth in detail later, is provided to the processors to run the operation of the system, and, in particular, to control access of the microprocessors to the bus.

In accordance with the preferred embodiment of the instant invention disclosed herein, each of the processors 22-34 is a modular microprocessor card, such as the standard commercially available card sold as Model 10804A by ESI Enterprise Systems of Dover, N.H. Those standard cards are modified somewhat, (as will be described in detail later) to effect proper controller operation. Suffice it to state that each processor card in the controller 22 includes a buffered and fully-expandable 6502 microprocessor based logic system with on-board RAM, ROM, programmable parallel I/O, programmable interval timers and serial I/O with programmmable baud rates. Each card also includes a RAM with sockets for up to 2K bytes, and sockets for up to 8K of EPROM or ROM. Two programmable I/O chips and an asynchronous communication interface adapter with baud rate generator are also included in each card. The common memory card is also a standard CMOS Random Access Memory Card, such as that sold by ESI Enterprise Systems as Model 10701.

Figure 2:
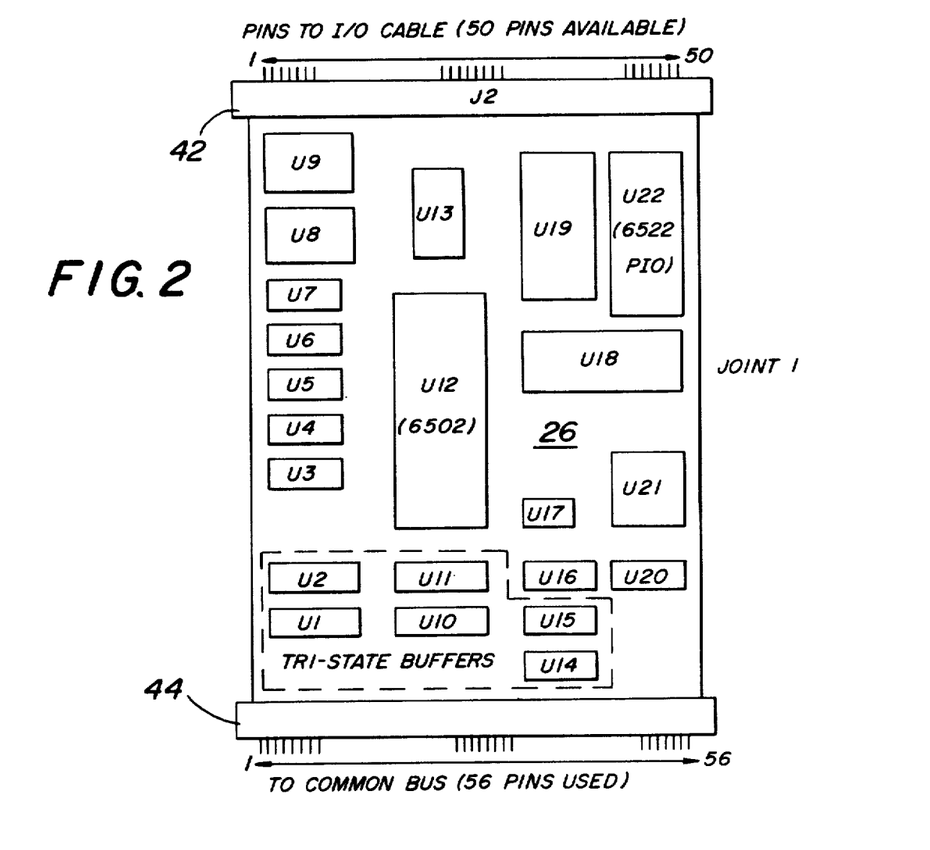
FIG. 2 is a plan view of a typical microprocessor card used in the controller shown in FIG. 1.

In FIG. 2 there is shown a plan view of a typical processing card, e.g., the joint 1 processing card 26. All of the other processing cards are of similar construction save for the individual modifications to the standard ESI 10804A cards, as will be described in detail later.

As can be seen in FIG. 2, each processor card has a J2 connector 42 at its upper end for connection to the I/O control cable 40 and a bus connector 44 at its lower end for connection to the common bus 38. The J2 connector 42 includes 50 output pins, numbered 1-50. As will be seen later, only selected one's of the pins are connected, via the input/output cable control lines 40, to associated pins of the other processor cards of the controller 20. The bus connector 44 includes a total of 56 pins, numbered 1-56, and which are connected to corresponding pins of the other processor cards of the controller 20 by the common bus 38.

Figure 3:
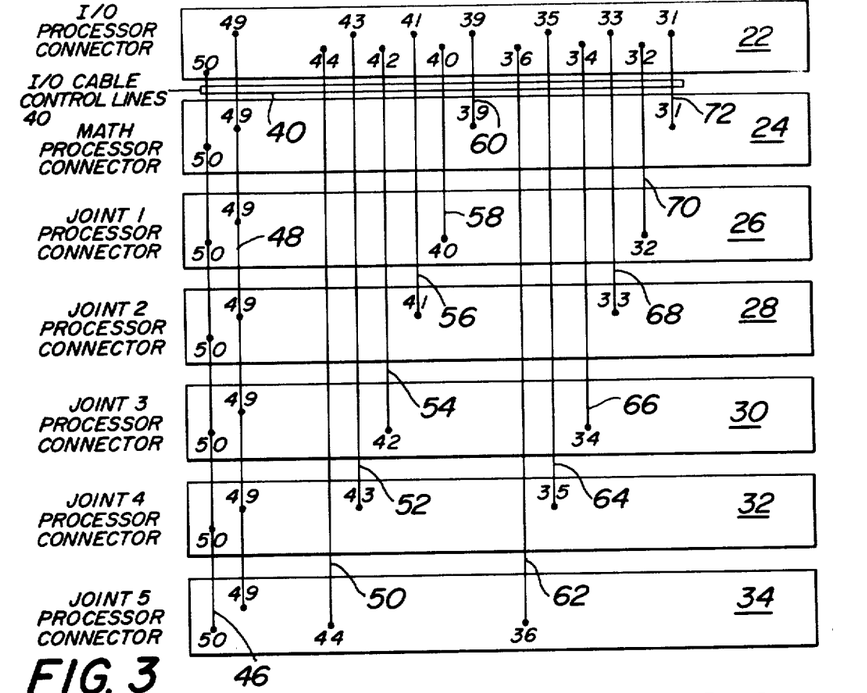
FIG. 3 is a wiring diagram showing the interconnection of various pins of the microprocessor cards shown in FIG. 1.

In accordance with the commerical embodiment of this invention, the common bus is manufactured by Prolog and is identified as an "STD" bus. The control connections between the processors 22-34 to effectuate access to the bus is provided, via various connections or lines in input/output control cable 40. Those connections are shown in FIG. 3. Thus, as can be seen therein, there are connections between the pin J2 of connector 42 of the I/O control processor card 22, the math processor card 24, the joint 1 processor card 26, the joint 2 processor card 28, the joint 3 processor card 30, the joint 4 processor card 32 and the joint 5 processor card 34. Only those pins which are interconnected with other pins are shown in FIG. 3, and all of the unconnected pins are omitted from that figure in the interest of drawing simplicity. In particular, pins 50 of all of the cards 22-34 are electrically interconnected by common conductor 46 of the I/O cable 40. In a similar manner, all of the pins 49 of all of the processor cards are interconnected by a common conductor 48 of the I/O cable. The pin 44 of the card 22 is interconnected to the corresponding pin of the card 34 by conductor 50. The pin 43 of the card 22 is connected to the corresponding pin of the joint 4 processor card 32 by conductor 52. The pin 42 of the card 22 is connected to the corresponding pin of the joint 3 processor card 30 by conductor 54. The pin 41 of the card 22 is connected to the corresponding pin of the joint 2 processor card 28 by conductor 56. The pin 40 of the card 22 is connected to the corresponding pin of the joint 1 processor card 26 by conductor 58. The pin 39 of the card 22 is connected to the corresponding pin of the math processor card 24 by connector 60. The pin 36 of the card 22 is connected to the corresponding pin of the joint 5 processor card 34 by conductor 62. The pin 35 of the card 22 is connected to the corresponding pin of the joint processor card 32 by conductor 64. The pin 34 of the card 22 is connected by the corresponding pin of the joint 3 processor card 30 by conductor 66. The pin 33 of the card 22 is connected to the corresponding pin of the joint 2 processor card 28 by conductor 68. The pin 32 of the card 22 is connected to the corresponding pin of the joint 1 processor card 26 by conductor 70. The pin 31 of the card 22 is connected to the corresponding pin of the math processor card 24 by conductor 72.

In accordance with the main aspect of the instant invention, all of the microprocessor cards of the controller 20 operate in parallel and on a continuous basis internally to perform their desired tasks. However, the processors are sequenced periodically to provide each processor with exclusive access to the common bus 38 during a predetermined period of time for effecting communication with other processors or portions of the system. In that regard, the individual or local processors continue to operate internally to perform their functions until bus access is provided. Thus, no processor card has to enter a "wait" state in which their internal operation effectively ceases until the occurrence of some event. This continuous operation feature enables the maximum utilization ot the processing capacity of the cards. Accordingly, the joint processors perform the joint maneuvering computations and control, while the math processor card performs its calculations and computations, all occurring continuously without any having to stop operation.

The individual processor cards are provided access to the bus sequentially each millisecond in a predetermined order, e.g., starting first with the math processor, followed by the five joint processors and so forth. When a processor card is provided access to the bus, it is said to be operating in the external mode, since it can now communicate with other portions of the system which are connected to the bus. Such other portions can be other processors, (e.g., other joint processors), or other electrical or electronic components used in the system, e.g., bubble memories, diagnostic components, sensory feedback modules, etc.

The common memory card 36 is connected to the bus and serves as the depository of messages from the controllers' processors. Thus, the processors on the bus are enabled to send and receive messages to each other, via the memory card, during their respective bus access time periods. In order to preserve message integrity, only one processor at a time is given access to the bus.

In the commercial embodiment of the instant invention, the I/O processor card has be arbitrarily designated as the driving element in the bus access algorithym by arranging it to direct access to the bus. Thus, in that embodiment, the processors 26-34 are granted access to the bus by the operation of the I/O processor card 22.

Access to the common bus for each processor card is actually effected by the processor card's tri-state buffers. The buffers are made up of the card's integrated circuits U1, U2, U10, U11, U14 and U15. The tri-state buffers serve to separate the bus from the card when disabled and to allow signals to pass therethrough in either direction, i.e., read or write, to the bus when enabled. The enablement of the tri-state buffers is controlled by an ABENABLE signal. This signal is produced by the processor card's U16 PROM, as will be described later.

Figure 5:
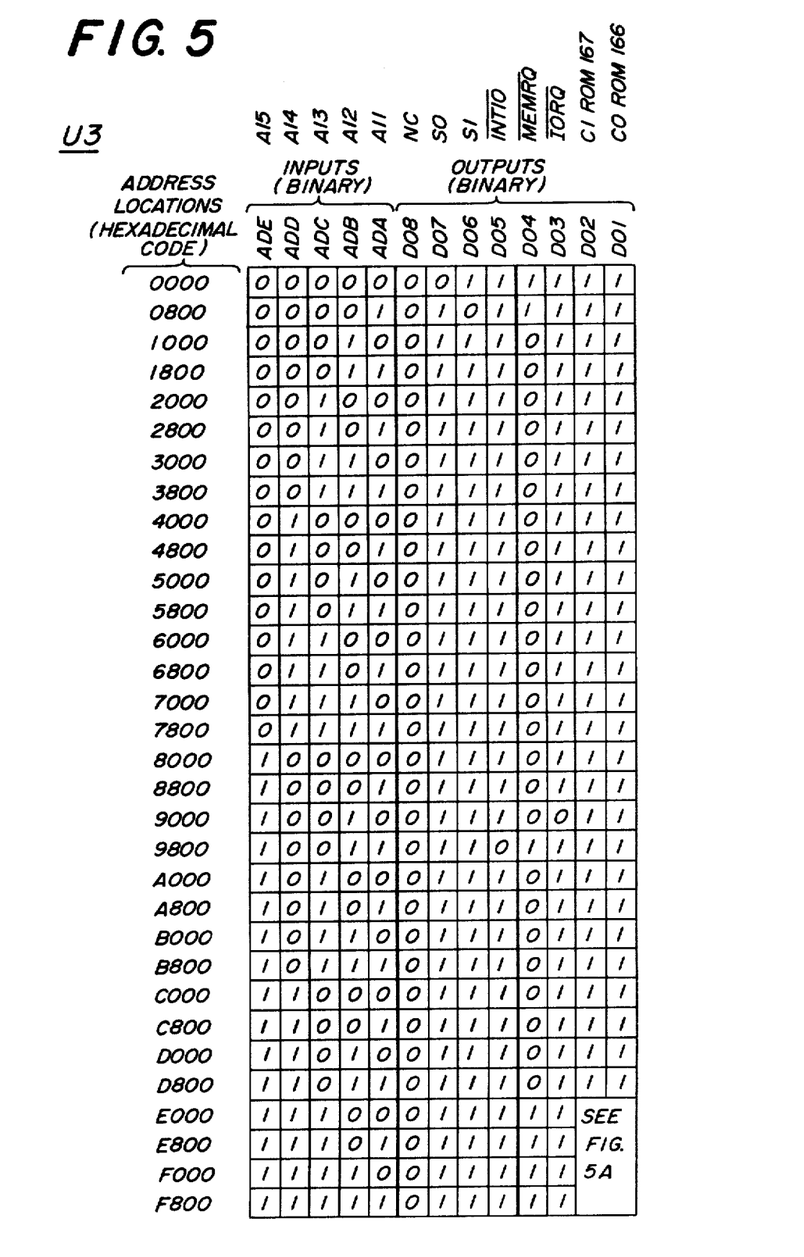
FIG. 5 is a table showing various inputs and outputs for address locations of a PROM in each of the cards of the controller.
Figure 5A:
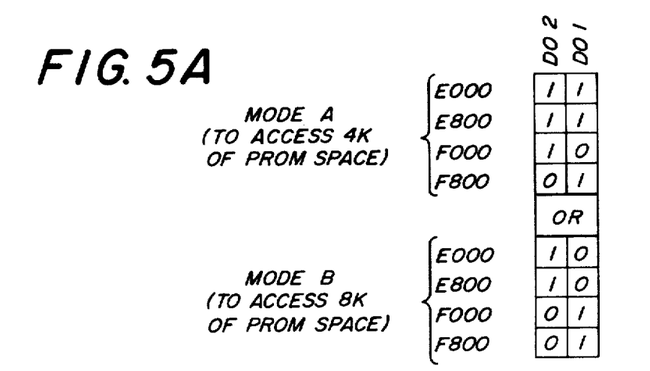
FIG. 5A consists of two alternative table portions in the PROM table portion of FIG. 5 identified by the legend "See FIG. 5A"
Figure 6:
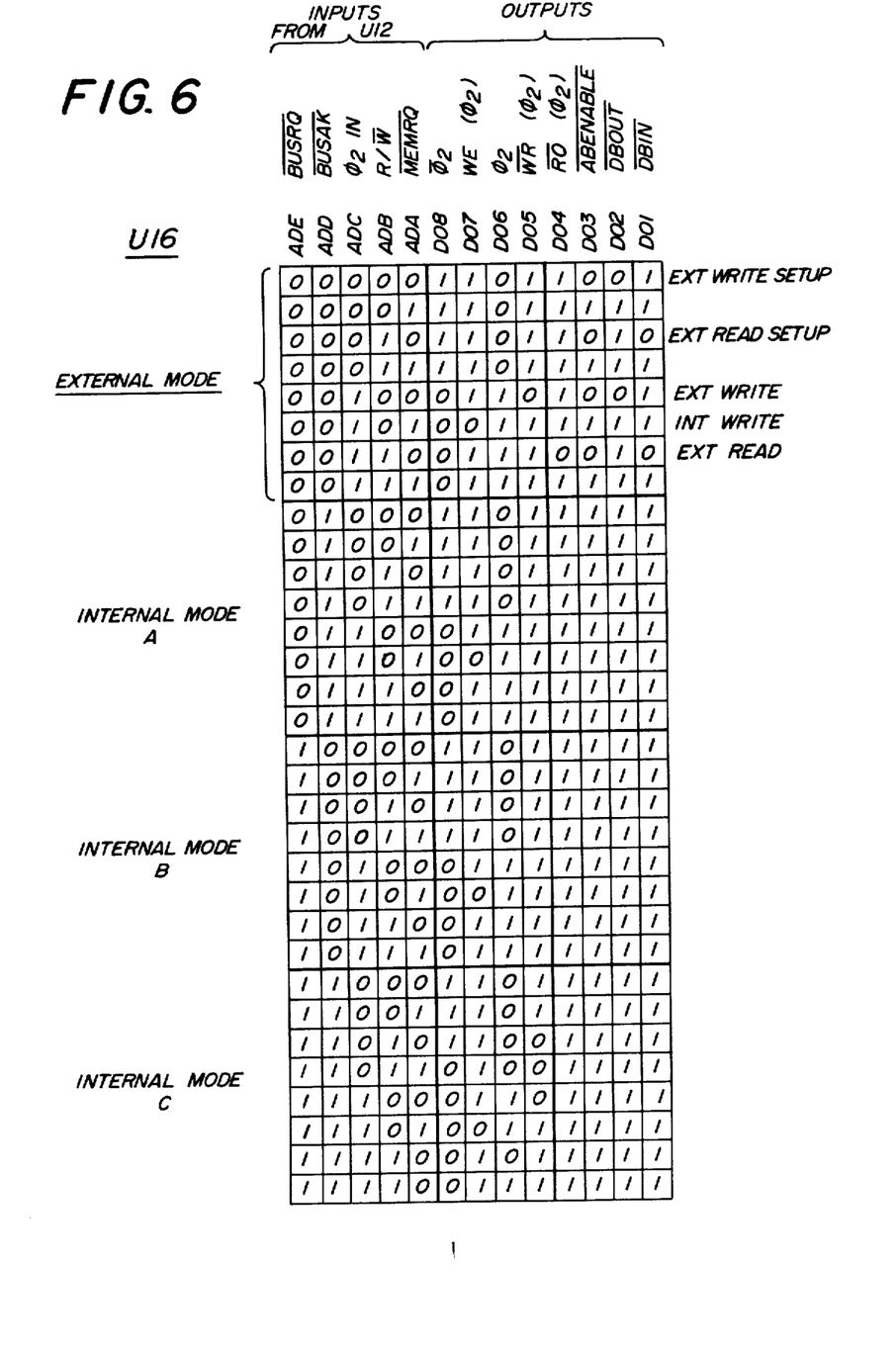
FIG. 6 is a table showing inputs and outputs of another PROM of each of the cards of the controller.

While each of the processor cards of the controller 20 include various PROMS, only PROMS U13 and U16 are relevant for the instant invention. The contents of those PROMS are shown in FIGS. 5, 5A and 6, respectively. Moreover, each of the processor cards also include various EPROMS for operating the logic defined by the PROMS U3 and U16. In each of the joint processor cards, only one EPROM is necessary and that is located at U9. On the math processor card, as well as on the I/O processor card, EPROMS are provided at both U8 and U9.

In the controller 20 of the instant invention, a low or "0" signal effects operation of the associated circuitry. Thus, when the ABENABLE signal is high or "1", data cannot pass through the tri-state buffers to the common bus 36. Conversely, when the buffers are enabled by a low or "0" ABENABLE signal, data can pass through the buffers to the bus.

In FIG. 6, there is shown in tabular form a map of the various inputs and outputs to PROM U16 of a typical system processor. Thus, the PROM U16 receives five input signals on lines ADA, ADB, ADC, ADD and ADE, namely, MEMRQ (memory request), R/W (read/write), 02 In (phase 2 input), BUSAK (bus acknowledge) and BUSRQ (bus request). These inputs are five standard outputs from the card's U12 microprocessor. The I/O control processor card 22 has control of the BUSAK signal to provide the same to the input of the U16 PROM on any other processor card, while the BUSRQ signal is provided from the card itself. Thus the I/O control processor card has control of the BUSAK signal, while any one of the joint processor cards 26-34 or the math processor card 24 has control of the BUSRQ signal.

In the internal mode of operation, that is while the processors are operating in parallel and before any processor is given access to the bus, the BUSRQ and BUSAK signals are both high so that the ABENABLE output from the PROMS U16 on the respective processor cards is high. This high signal disables the associated tri-state buffers so that no data can pass therethrough to or from the bus.

As can be seen in FIG. 6, the ABENABLE signal is only low when there is a coincidence of low signals on the BUSAK and BUSRQ inputs to the PROM U16. Such a coincidence of low signals on the BUSAK and BUSRQ inputs establishes the "external" mode of operation of the card. It is during this mode of operation that the processor card is allowed access to the bus to enable it to communicate with other processors or external portions of the system.

As can also be seen in FIG. 6, even when the BUSAK and BUSRQ signals are both low (so that the card is in the external mode), a low ABENABLE signal is not provided to the card's U16 PROM until there also exists a low MEMRQ signal. The MEMRQ signal is the function of the signals appearing at the inputs of the various address locations for PROM U3 of the card. To that end, as can be seen in FIG. 5, the output signal MEMRQ of U3 is low for all address locations from $1000 to $97FF (the symbol $ meaning hexadecimal code). Thus, at those address locations, the MEMRQ output goes low, whereupon the card's tri-state buffers are enabled to permit the card to communicate with other portions of the system, via the common bus.

Once the local processor card, that is the joint processor card or a math processor card, which is on the bus, has finished its use of the bus, it raises the BUSRQ input to its U16 PROM. This action has the effect of immediately disabling its tri-state buffers, thereby precluding further access to the bus by that card and placing the card back in its internal mode of operation, i.e., internal mode B. The high signal appearing on the BUSRQ line is also coupled, via the I/O cable control line 40, to the I/O control processor card 22, whereupon its BUSAK line ADD is raised high so that the card is in internal mode C.

In accordance with the commercial embodiment of the instant invention, once any local card takes access to the bus, it can retain such access for as long as necessary, that is until it provides the high signal on its BUSRQ line. In general, each of the local processors is on the bus between 75 and 200 microseconds.

The detailed operation of the I/O processor card 22 and a typical local processor card, such as joint 1 processor card 26, to allow the latter access to the common bus will now be described with reference to FIG. 4. As can be seen therein, the I/O processor card 22 and the joint 1 processor card 26 are shown schematically with only certain portions of their integrated circuit complement identified.

Each processor card includes a peripheral I/O (PIO) circuit U22. In accordance with the commercial embodiment of this invention, that circuit is a Rockwell No. 6522. The PIO circuit is a bi-directional, 2-port chip, having ports A and B. As can be seen, port A of the chip U22 of the I/O processor card is connected to the corresponding port of the PIO chip U22 of the joint 1 processor card 26 by conductor 80. That conductor is a portion of the I/O control cable 40 and is also connected to the BUSRQ input of the U16 PROM of the joint processor card 26. The port B of the U22 PIO circuit of the I/O processor card 22 is connected to the CB1 pin of the corresponding PIO chip U22 of the joint 1 processor card 26 by conductor 82. That conductor is also a portion of the control cable 40 and is connected to the BUSAK input of the U16 PROM on the joint 1 processor card 26.

The control signals for access to the common bus are generated by the PIO U22 on the I/O processor card and the chosen local processor card. It is these signals which control the tri-state buffers.

Figure 4:
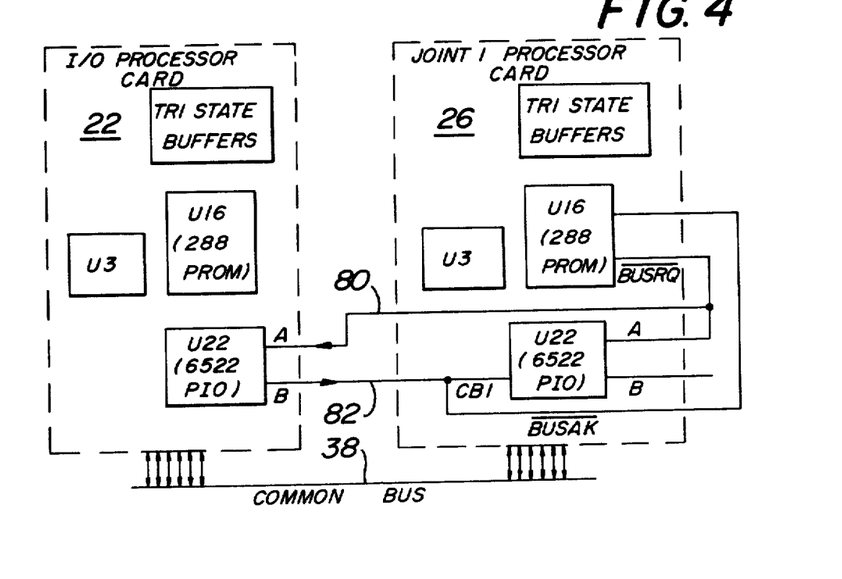
FIG. 4 is a schematic diagram showing the interconnection between two cards shown in FIG. 1.

As can be seen in FIG. 4, line 82, which is also connected to the CB1 pin of the joint 1 processor card 26 PIO U22, is also connected to the U3 PROM BUSAK input line.

Before any local processor card is given access to the bus by the I/O control processor card 22, as will be set forth hereinafter, the I/O control card gets itself off the bus under control of its U16 PROM.

Each processor card is given access to the bus once each millisecond. This action occurs through the operation of one of timers in the I/O processor's PIO chip U22. In this regard, the timer in the PIO chip provides an interrupt signal once each millisecond. This repetitive signal is used to cause the program which is in the I/O processor card 26 EPROM to go into an "interrupt" routine. This routine is specifically shown in the software set forth later. The interrupt routine is provided to sense that there is a true timer interrupt. If so, then a bus grant routine is utilized. The bus grant routine is also described in the sofware set forth later. Thus, when the "interrupt" is a timer interrupt, the first thing which occurs is that a high signal is provided on the BUSRQ input to the I/O control processor's PROM U16. This action causes that card's tri-state buffers to isolate the card from the bus. After that occurs, the I/O control processor card allows the next successive local processor access to the bus. In particular, the corresponding bit of port B of the PIO circuit U22 of the I/O processor card goes low. This signal is coupled by line 82 of the I/O control line 40 to the CB1 pin of the corresponding PIO on the next processor, e.g., the joint 1 processor card 26. This low BUSAK signal is also provided as an input to the PROM U16 of the joint 1 processor card 26, which causes a low signal to appear on the high order bit of the PIO U22 of that card's port A. That low BUSAK signal is provided as an input to the PROM U16 of the card 26. Thus, there is a coincidence of low BUSRQ and BUSAK signals at the inputs to PROM U16. This places the joint 1 processor card in the "external mode" to allow it access to the bus. As seen in FIG. 5, when the joint 1 processor accesses a memory space between $1000 and $97FF, the MEMRQ line goes low. This signal is provided as an input to the PROM U16, whereupon the low ABENABLE signal is produced. Accordingly, the tri-state buffers of the card 26 are enabled to give the card access to the bus to either read or write data at any location within these address limits.

The common bus memory card 36 is electrically connected to the bus at all times and thus receives data written from the joint 1 processor card.

At the time that the low BUSRQ signal is provided to the input of PROM U16 of the joint 1 processor card 26, it is also provided by the conductor 80 of the I/O control line 40 back to the port A of the PIO U22 of the I/O processor card 22. Accordingly, the I/O processor card is advised that a bus grant was taken by the joint 1 processor, and thus the I/O processor card now sits in a wait loop until line 80 goes high.

When the joint 1 processor has completed any use it may or may not have had for the bus 38, it concludes its external mode of operation by raising the high order bit of its PIO U22 at port A. This has the effect of disabling the tri-state buffers of the processor card 26 and, in addition, informs the I/O processor, via its PIO chip U22, that the joint processor card 26 has finished with the bus. The I/O processor then raises the appropriate bit of port B. This action causes the BUSAK line to go high placing the PROM U16 back in internal mode C. The I/O processor card 22 performs the same operation in conjunction with the joint 2 processor card 28 to provide it with access to the bus. Each successive processor is provided access to the bus in order. The I/O processor has access to the bus during the remainder of the one millisecond interval after all the local processors have had access to the bus.

As will be appreciated from the foregoing, both the sending I/O processor card 22 and the receiving local processors 24-36 must provide a positive indication that the I/O processor card has granted access to the bus and that the local processor has taken positive action to take advantage of the bus grant. This collective positive action required from both the sending and the receiving processors within the system guarantees that only one processor's tri-state buffers will be enabled at any one time. Accordingly, only one processor can provide signals on the bus at any one time. This avoids various electrical and software problems of having more than one processor accessing the bus at the same time.

In accordance with the instant invention, any number of processors can be physically connected on the common bus 38 for sequential electric access thereto. Thus, it is necessary that the I/O processor card determine how many of the other processors are physiclly connected to the bus. The algorithm for determining this fact is established in the software program identified as "TELWHO", also set forth hereinafter. Suffice it to say that the "TELWHO" program is as follows: When the power supplies to the bus are first turned on, initialization routines determine how many processors are on the bus. This occurs by each processor being given a message at a fixed location in the common bus memory card 38. This identifies each processor. With this identification information, each local processor can calculate its unique address in the common memory where it can send or receive messages. The routines for accomplishing the above are "WHICH" and "RAMADD", as set forth hereinafter. Later, the I/O processor card 22 sends out a second message through the described communication means which requests that each processor card on the bus to answer the question, "ARE YOU AWAKE?". This question is in the form of a coded message which each processor recognizes as the "AM I AWAKE" message. That message is provided, via the common bus from the I/O processor card to the common memory card. When each joint processor gets an opportunity to get on the bus during the first operational sequence, it reads the "AM I AWAKE" message into its own buffer memory. When the processor then goes "off" the bus, it is operating in the internal mode at which time it determines that it is, indeed, awake. During the next interval that the processor has access to the bus, it sends out a "I AM AWAKE" message on the bus to the common memory. When the I/O processor card has access to the bus, it reads the "I AM AWAKE" message and sets a bit in the "ALIVE" location in the I/O processor's data memory. This memory includes bits indicating which of the processors connected to the bus are alive. That information is necessary for the operation of the interrupt routine since that information is used by the I/O processor card to see if a processor is alive before allowing that processor to access the bus and to identify to the I/O processor card where on the bus the local processors are located.

As set forth above, during the initialization phase, the joint processors, as well as the math processor, are each arranged to calculate an address in the common memory to which they will send or receive messages. It is this initial operation that allows an arbitrary number of processors to be connected to the bus. In addition, the local processors assigned position on the bus is established at this time. Thus each processor on the bus has a unique address on the common memory card through which messages are sent and received.

The common bus memory card 36 is physically connected to the common bus like all processor cards 22-34. However, it has electrical access to the bus at all times, unlike the processor cards 22-45. This is necessary inasmuch as the common memory card 36 is used in the controller 20 as the depository for messages between various processors on the bus. Thus, once the assignment of each processor has been made on the bus as set forth above, specific ranges of memory are reserved in the memory card for the messages to and from that particular processor. In the commerical embodiment of the controller of the instant invention, the locations $1000-$1100 are reserved for interprocessor communication. A message to a processor is delivered to a specific location within that processor's memory space on the memory board.

In order to retain message integrity, that is to verify that the data was received by the processor to whom it was directed and was not overwritten by new messages, the high order bit in the command byte serves as a signal to indicate whether a message was active (unreceived) or not. In this regard, if the high order bit of the command byte is high, that means that a message was not received by the processor to whom the message was directed. When the receiving processor is allowed access to the bus and actually receives the message through the bus from the common memory card 36, it clears the high order bit of the command byte, i.e., changes it to "0" and writes it back into the same memory location. This action indicates that a message was received and that a new message may now be written. If the sending processor notices that the high order bit is set ("1"), it will not overwrite the existing message, but will wait until the high order bit is cleared. This procedure guarantees that no message is overwritten by any other message until after it has been received.

As should be appreciated from the foregoing, the common bus memory card 36 serves as a storage area for messages between the individual processors of the system. Thus, intercommunication between the processors on the bus is accomplished indirectly through the common memory card. The individual processors forming the controller 20 operate in parallel, that is they operate continuously in their internal mode to perform their calculations and are sequentially given access to the bus to provide data to the common memory card or for receiving data from the common memory card. Data which is provided to the common memory card is thus made available for other processors to read when such processors gain access to the bus. The memory card 36, in addition to serving as the common communication area between the processors of the system, also provides the robotic system with means for storing robot programs. In the commerical embodiment of the instant invention, the memory card 36 is a CMOS card with a battery backup so that when the robotic system is turned off, the stored robot programs remain in memory.

It must be pointed out at this juncture that while the common bus memory card is important insofar as enabling communication between the processors, the instant invention is of broader scope. In this regard, by the use of the common bus, with each of the processors of the controller connected thereto and given access to the bus sequentially, one can add as may processors or other peripheral equipment to the system as is required to perform a desired task. Thus, in the context of the instant invention, the memory card is only necessary for communication between the processors.

As noted earlier, each of the processor cards is a basic ESI 10804A card, which has been modified slightly for use in the controller 20. To that end, the joint processor cards are modified from the standard cards provided by the manufacturer as follows. The pins 41, 42 and 44 of the common bus connector 44 are electrically isolated form the circuitry of the card. The pins 13–19, 31–37 and 39–46 at the J2 connector 42 are all electrically isolated from the circuitry of the card. In addition, the pins 13–20 of the J2 connector are all electrically interconnected as are pins 31–38 and pins 39–47. Moreover, the pin 38 of the J2 connector is connected to the pin 13 of the U16 PROM of the card. Furtherstill, the pin 47 of the J2 connector is connected to pin 14 of the U16 PROM.

The I/O processor is also a standard ESI 1084A card which has been modified as follows: The integrated circuit U21 is removed. The pins 41, 42 and 44 of the common bus connector 44 are electrically isolated from the circuitry of the card. The pin 46 of the J2 cable connector 42 is electrically connected to pin 14 of the U16 PROM of the card. In addition, pin 50 of the connector 42 is electrically interconnected to pin 13 of the U16 PROM.

The EPROMS sockets of the I/O processor card 22 are also modified to accomplish addressing of the I/O processor EPROMS. In this regard, in U9 there is provided a 4K EPROM, whereas, in U8 there is provided an 8K EPROM. In addition, pin 21 of U8 and pin 21 of U9 are electrically isolated from each other. Furtherstill, pin 21 of U8 and pin 22 of U12 are all electrically connected. In addition, the jumpers A, B, C, D, E and F are electrically isolated from the EPROMS. Furthermore, there is an electrical connection between jumper A and A3, B and B1, C and C1, D and D1, E and E1 and F and F1 to the EPROMS.

The math processor card 24 is also a standard ESI 10804A card which has been modified as follows: Pins 31–37 and 39–46 of the I/O connector cable 42 are electrically isolated from the corresponding portions of the card. Pins 31–38 of the connector 42 are electrically interconnected as are pins 39–47. Pin 38 of the connector 42 is electrically connected to pin 13 of the card U16 PROM. Pin 47 of the connector J2 is electrically connected to pin 14 of the card U16 PROM. Pins 41, 42 and 44 of connector 44 are electrically isolated from the associated circuitry on the card.

As described heretofore, the electrical access to the common bus is accomplished through the operation of the PROMS U3 and U16 of each of the cards under the direction of the software in their EPROMS. In this regard, the EPROMS set the level to the inputs of the PROMS U3 and U16 in such a manner that each processor card gains access to the common bus, as set forth heretofore. The EPROMS U8 and U9 also include additional programming for effecting other operations of the robotic system not germane to the instant invention.

In FIG. 5 the inputs and outputs for various address locations of the PROM U3 are mapped in tabular form. FIG. 6 is a similar address map showing the inputs and outputs for the U16 PROM.

The address locations of the U3 PROM in FIG. 5 are shown in the leftmost column and are written in hexadecimal code. The inputs to the PROM are provided on lines ADA, ADB, ADC, ADD and ADE, respectively. The outputs of the U3 PROM are provided on line DO1, DO2, DO3, DO4, DO5, DO6, DO7 and DO8 and correspond to signals CO ROM 166, C1 ROM 167, IORQ, MEMRQ, INTIO, SI, SO and NC. Insofar as the instant invention is concerned, only the MEMRQ signal, as described heretofore, is used by the controller 20 to provide access to the common bus for the system's processors.

As shown in FIGS. 5 and 5A at the address locations E000–F800 there are two available sets of outputs DO1 and DO2. Those two sets of outputs are identified as mode A and mode B. The outputs of mode A represents the manner of accessing 4K of PROM space, while the outputs of mode B represents the accessing of 8K of PROM space. These two modes are necessary in order to utilize either 4K or 8K EPROMS. In this regard, in the joint processors in the commerical embodiment of the instant invention, the outputs of PROM U16 are mode A outputs, since 4K of PROM space is used. In the math processor card, 8K of PROM space is used. Thus, the PROM U16 outputs are the mode B outputs.

Attached hereto as Exhibit A is the software (programming) described heretofore for effecting operation of the controller. The programming is set forth in the language identified as CSL-65 and M65, both of which are sold by Compass Microsystems of Ames, Iowa.

As will be appreciated from the foregoing, the controller of the instant invention is formed of modular microcomputer based components and has a common bus and common memory. These features permit the simple addition of plug-in modules to enable the user to add system capabilities, as desired. Thus, the system can be expanded to include various additional capabilities, such as bubble memory, diagnostics, etc. Moreover, by interconnecting all the processors on a common bus, the processing load throughout the system can be shared expeditiously. Furtherstill, inasmuch as the individual processors operate continuously without requiring any to go into a wait mode before gaining access to the bus, maximization of processing capacity is effectuated.

Without further elaboration, the foregoing will so fully illustrate our invention that others may, by applying current or future knowledge, readily adapt the same for use under various conditions of service.

EXHIBIT A1

Common Bus Software Routines

1. Common Bus Software Routines Index
2. Data and constants definitions for I/O processor routines
3. I/O processor interrupt routine
4. I/O processor TELWHO and DELAY routines
5. I/O processor AWAKE routine
6. Local (Math or Joint) Processor Data and Constants Defintitions
7. Local (Math or Joint) Processor GETWHO routine
8. Local (Math or Joint) Processor INT or Interrupt routine
9. Local (Math or Joint) Processor WHICH routine
10. Local (Math or Joint) Processor RAMADD routine

EXHIBIT A2

"I/O PROCESSOR CODE DATA DEFINITIONS"

```
DCL ALLOW BYTE INIT[0];          "CURRENT CONTENTS OF OUTPUT REGISTER"
DCL ALIVE BYTE INIT[0];          "ALIVE PROCESSORS"
DCL JTABLE WORD INIT[$1000];     "BASE ADDRESS OF JOINT TABLE IN CMOS"
DCL JOFF WORD INIT[$10];         "JOINT TABLE OFFSET-32 BYTES PER"
DCL I BYTE;                      "LOOP VARIABLE"
DCL J BYTE;                      "LOOP VARIABLE"
DCL TEMP BYTE;                   "TEMPORARY STORAGE"
DCL CALLER WORD INIT[1];         "LAST REQUESTOR POINTER"
DCL TEMP1 WORD INIT[0];          "ALL OF THESE ARE TEMP STORAGE"
```

"I/O PROCESSOR CODE CONSTANT DEFINITIONS"

```
DEF ALLOWD=$9820;                "ADDRESS OF I/O OUTPUT PORT B"
DEF REQUST=$9821;                "ADDRESS OF I/O INPUT PORT A"
DEF IOCTL1=$9824;                "PORT1 WRITE COUNTER, READ LATCH"
DEF IOINT=$982D;                 "PORT 1 INTERRUPT FLAG REGISTER"
DEF ION=$7F;                     "THIS ALLOWS THE I/O PROCESSOR ON THE BUS"
DEF OTSTAT=3;                    "OUTPUT STATUS OFFSET"
DEF ALIVCK=$84;                  "I AM ALIVE FROM JP"
DEF NJOINT=5;                    "NUMBER OF JOINTS"
DEF BEGMEM=$1000;                "BEGINNING OF CMOS MEMORY"
```

EXHIBIT A3

```
        PAGE 'INT';

"INT:   THIS IS THE IO PROCESSORS INTERRUPT ROUTINE. ESSENTIALLY"
"       IT SEQUENTIALLY ALLOWS EACH PROCESSOR ON THE BUS UNTIL HE"
"       IS DONE. WHEN IT IS DONE, IT ALLOWS THE I/O PROCESSOR BACK ONTO"
"       THE BUS. THIS IS THE BUS'S NORMAL STATE."

INT:    BEGIN;
        STACK .A,.Y,.X;          "NORMAL INT RTN STUFF HERE"
*
        LDA     IOINT            ;TIMER INTERRUPT?
        AND     #$40             ;THIS IS THE TIMER INTERRUPT BIT
        BEQ     INT8             ;NO TIMER INTERRUPT
        LDA     IOCTL1           ;CLEAR THE TIMER INTERRUPT
IN111   LDA     #$0              ;CLEAR ALLOW
        SEC
        BCS     INT4             ;THIS HAPPENS ALWAYS
INT3    CLC                      ;THIS HAPPENS MOSTLY
        LDA     ALLOW
INT4    ROL     A
```

```
            CMP    #$40                    ;THIS IS THE LAST ONE
            BEQ    INT8
            STA    ALLOW
            EOR    #$FF                    ;EOR THIS ONE BIT[AS IT SHOULD BE]
            STA    ALLOWD                  ;HIT THE LOCAL NOW
            LDY    #$05                    ;WAIT TILL HE GETS ONE(USE OB WHEN TESTING)
INT20       DEY                            ;OR 05 FOR REAL
            BNE    INT20
INT6        LDA    REQUST                  ;WAIT FOR THE GUY TO GET OFF THE BUS
            EOR    #$FF                    ;WE JUST WANT ONE BIT!
            BNE    INT6                    ;WE GO IT
            BEQ    INT3                    ;AND GO BACK FOR MORE
INT8        LDA    #ION                    ;LET ME BACK ON
            STA    ALLOWD                  ;OK
*
            UNSTACK .X,.Y,.A;                   "RESTORE EXTERNAL STATE"
NMI:        RTI;                           "NMI INTERRUPT VECTOR ADDRESS"
            END;
```

EXHIBIT A4

```
        PAGE 'TELWHO';

"TELWHO:THIS ROUTINE IS USED ONLY ONCE. IT IS USED WHEN THE MACHINE"
"       IS FIRST STARTED UP. ITS PURPOSE IS TO INTERRUPT EACH PROCESSOR"
"       ON THE BUS AND INFORM THEN WHO THEY ARE ON THE BUS."

TELWHO: BEGIN;                      "TELL WHO THEY ARE"
        ALLOW=1;                    "THIS IS HOW WE WILL INTERRUPT THEM"
        FOR I = 0 TO 6
        DO;                         "TRY ALL THE PROCESSORS"
            BEGMEM=ALLOW;           "SET UP THE MESSAGE FIRST"
            ALLOWD=ALLOW .EOR $FF;  "NOW LET SOMEONE ELSE ON"
            TEMP=1;
            CALL DELAY;
            SHIFT LEFT ALLOW;
            ALLOWD=#ION;            "NOW LET I/O PROCESSOR BACK ON"
        END;
        RETURN;
        END;

"DELAY: THIS ROUTINE DELAYS 1 MILLISECOND TIMES THE NUMBER HELD IN TEMP"

DELAY:  BEGIN;
        FOR J = 0 TO TEMP
        DO;
            TEMP1[1]=$02;       "ONE MILLI-SECOND"
            TEMP1=$80;          "OR THEREABOUTS"
DELA1:      IF TEMP1[1] *= 0 THEN
            DO;
                DECW TEMP1;
                GO TO DELA1;
            END;
        END;
        RETURN;
        END;
```

EXHIBIT A5

```
        PAGE 'AWAKE';

"AWAKE: THIS ROUTINE WAKES ALL OF THE OTHER PROCESSORS ON THE BUS UP"
"       THIS ONLY HAPPENS ON INITIALIZATION"
```

```
AWAKE:  BEGIN;
        CALLER.2=JTABLE;                "PUT THE ALIVE CHECK MESSAGGE"
        FOR I=0 TO #NJOINT
        DO;                             "INTO ALL OF THE OTMES AREAS"
            &CALLER[#OTSTAT]=#ALIVCK;
            CALLER=CALLER+JOFF;
        END;
        RETURN;
        END;
```

EXHIBIT A6

LOCAL PROCESSOR DATA DEFINITIONS

```
DCL COMSAT BYTE INIT[0];        "COMMUNICATION STATUS BYTE"
DCL OUTMES BYTE INIT[0];        "OUTOUT MESSAGES TO RAM"
DCL PPOS BYTE INIT[0];          "PRESENT POSITION"
DCL PPOS1 BYTE INIT[0];         "PRESENT POSITION HIGH BYT"
DCL INMES BYTE INIT[0];         "INPUT MESSAGE BYTES FROM RAM"
DCL JTABLE WORD INIT[$1000];    "BASE ADDRESS OF JOINT TABLE FOR THIS JOINT"
DCL OUTAB WORD INIT[0];         "CMOS RAM BASE ADDRESS"
DCL WHO BYTE INIT[0];           "THIS IS THE UNIVERSAL WHO BIT FOR COMM"
DCL NOTWHO BYTE INIT[0];        "COMPLEMENT OF WHO"
DCL POSN1 WORD INIT[0];         "THIS IS THE LOW ORDER INDIRECT ADDRES TO CONTER"
DCL POSN2 WORD INIT[0];         "THIS IS THE HI ORDER INDIRECT ADDRES TO CONTER"
DCL FREEZ WORD INIT[0];         "THIS IS THE FREEZE ADDRES FOR COUNTER"
DCL I BYTE;
DCL TEMP BYTE INIT[0];          "TEMPORARY BYTE"
DCL TEMP1 WORD INIT[0];         "TEMPORARY WORD"
DCL SHFTR BYTE INIT[0];         "USED TO DECIPHER WHO"
DCL JOFF BYTE INIT[$10];        "OFFSET FOR JTABLE ASSIGNMENTS"
```

LOCAL PROCESSOR CONSTANT DEFINITIONS

```
DEF IOINT=$982D;                "PORT 1 INTERRUPT FLAG REGISTER"
DEF XDDRB=$9842;                "PORT 2 DATA DIRECTION REG FOR B"
DEF XDDRA=$9843;                "PORT 2 DATA DIRECTION REG FOR A"
DEF IODDRB=$9822;               "PORT 1 DATA DIRECTION REG FOR B"
DEF IODDRA=$9823;               "PORT 1 DATA DIRECTION REG FOR A"
DEF INTERP=$80;                 "GOT AN INTERRUPT"
DEF BEGMEM=$1000;               "BASE ADDRESS FOR CMOS RAM"
DEF ALIVCK=$84;                 "I AM ALIVE FROM JP"
DEF CB1INT=$10;                 "THIS IS A CB1 INTERRUPT IN IOINT"
DEF RESPND=$7F;                 "THIS IS RESPONSE TO BUS INTERRUPT"
DEF ALLOWD=$9820;               "ADDRESS OF I/O OUTPUT PORT B"
DEF REQUST=$9821;               "ADDRESS OF I/O INPUT PORT A"
```

EXHIBIT A7

```
        PAGE 'GETWHO';

"GETWHO: THIS ROUTINE FIGURES OUT WHICH PROCESSOR WE ARE ON THE BUS"
"        IT WAITS FOR AN INTERRUPT AND FROM THE INFORMATION AT $1000,"
"        THE PROCESSOR FINDS OUT WHO IT IS"

GETWHO: BEGIN;
        IF IOINT .AND #CB1INT = 0 THEN GO TO GETWHO; "WAIT FOR INTERRUPT"
        .A=ALLOWD;              "CLEAR THIS INTERRUPT"
        REQUST=$7F;             "AND LET MYSELF ON"
        WHO=BEGMEM;             "THIS IS WHO WE ARE"
        NOTWHO=WHO .EOR $FF;    "THIS IS REQUIRED FOR WHICH, RAMADD"
```

```
            REQUST=$FF;             "AND GET MYSELF OFF THE BUS"
            CALL WHICH;             "GO FIND OUT WHO WE ARE"
            IFF .C THEN IN11;       "THIS IS AN ERROR"
            XDDRA=WHO;              "NOW WE KNOW WHO WE ARE, SET THE ARMDIR REGS"
            RETURN;
IN11:       HALT;
            END;
```

EXHIBIT A8

```
            PAGE 'INT';

"INT:       THIS IS THE INTERRRUPT ROUTINE FOR THE LOCAL PROCESSORS"

INT:        BEGIN;
*
            PHA                     ;SAVE ACCUMULATOR
            LDA     ALLOWD          ;CLEAR THE INTERRUPT
            LDA     #RESPND         ;THIS WILL LET ME ON
            STA     REQUST          ;AND CLAIM THE BUS:THE FIRST TIME NOTHING WILL HAPPEN
            TYA                     ;GET Y
            PHA                     ;AND STASH IT
            LDY     #$0             ;THIS TRANFERS THE JP'S STATUS TO THE I/O
            LDA     OUTMES          ;PROCESSOR
            BPL     INT2
            LDA     (OUTAB),Y       ;AM I FREE TO SAY THINGS?
            BMI     INT2            ;NO, BRANCH
            LDA     OUTMES
            STA     (OUTAB),Y       ;STORE OUR STATUS TO RAM
            AND     #$7F
            STA     OUTMES          ;BUT CLEAR THE HIGH BIT ON IT
;GET THE POSITION FROM THE ENCODERS
INT2        LDA     (FREEZ),Y       ;FREEZE THE ENCODER FOR THIS JOINT
            LDA     (POSN1),Y       ;GET LOW ORDER POSITION
            STA     PPOS            ;STORE IT
            LDA     (POSN2),Y       ;GET HI BYTE
            STA     PPOS1           ;AND STORE IT
            LDY     INMES           ;CAN I HAVE A NEW MESSAGE?
            BMI     INT6            ;NO, GET OUT OF HERE
            LDY     #$3             ;NOW GET THE INPUT DATA FROM RAM
            LDA     (OUTAB),Y       ;CHECK IF OUR INPUT IS NEW
            BPL     INT6            ;NO, IT ISNT
            STA     OUTMES,Y        ;YES IT IS
            AND     #$7F            ;CLEAR THE HIGH BIT, INDICATING
            STA     (OUTAB),Y       ;THAT THE MESSAGE WAS RECEIVED
INT4        INY
            LDA     (OUTAB),Y       ;THIS ROUTINE WILL GET NEXTIM
            STA     OUTMES,Y        ;AND NEXLOC, 2 BYTES EACH
            CPY     #$7             ;
            BNE     INT4            ;THIS TERMINATES THE MOVE
;THIS RESTORES THE BUS
INT6        LDY     #$FF            ;NOW RELEASE THE BUS
            STY     REQUST          ;OK, WE HAVE RELEASED THE BUS
            LDA     COMSAT          ;SAY THAT THIS HAS HEPPENED
            ORA     #INTERP
            STA     COMSAT          ;AND WRITE IT BACK
*
            UNSTACK .Y;
            UNSTACK .A;
NMI:        RTI;                    "NMI INTERRUPT VECTOR ADDRESS"
            END;
```

EXHIBIT A9

PAGE 'WHICH';

```
"WHICH: THIS ROUTINE FIGURES WHICH JOINT PROCESSOR THIS CODE SHOULD"
"       BEHAVE AS; IT IS ENTERED ONLY ONCE, AFTER THE FIRST INTERRUPT"
"       THIS ROUTINE WILL FAIL IF THERE IS MOE THAN ONE BIT IN ALLOWD THAT"
"       IS LOW AT THE TIME OF READING. IT WILL THEN LOOP ON ITSELF WITHIN"
"       THE INTERRUPT ROUTINE, THEREFOE BEHAVING AS THOUGH IT WERE DEAD"

WHICH: BEGIN;
*
        LDA     NOTWHO          ;LETS SEE IF THIS IS RIGHT
        EOR     #$FF            ;THERE SHOULD ONLY BE ONE BIT HIGH NOW
        STA     TEMP
        LDA     #$0             ;ZERO OUT THE ACCUMULATOR
        SEC
WHI1    ROL     A
        BEQ     WHI10           ;THIS SHOULD NOT HAPPEN
        CMP     TEMP            ;THIS TAKES CARE OF MORE THAN ONE BIT ACTIVE
        BNE     WHI1
        STA     WHO             ;THIS IS THE POSITIVE VERSION
        EOR     #$FF            ;INVERT IT AGAIN
        STA     NOTWHO          ;THIS IS THE MOSTLY NEGATIVE VERSION OF WHO
        JSR     RAMADD          ;NOW FIX UP THE RAM ADDRESSES
        CLC                     ;EVERYTHING WORKED
        RTS
WHI10   LDA     #$0             ;ZER OUT THE IO PORTS JUST IN CASE
        STA     IODDRB          ;DITTO
        STA     COMSAT          ;FAILED, TRY AGAIN
        SEC
        RTS
*
        END;
```

EXHIBIT A10

PAGE 'RAMADD';

```
"RAMADD:THIS ROUTINE FIXES UP THE ADDRESSES IN LOCAL RAM TO POINT TO"
"       THE RIGHT ADDRESSES IN CMOS FOR BUS ACCESSES. THE DEPENDENCY"
"       IS MADE UPON THE VALUE OF WHO, MULTIPLIED BY THE OFFSET JOFF,"
"       WHICH IS THE ADDRESS SPACE BETWEEN SUCCESSIVE COMMUNICATION"
"       AREAS IN CMOS RAM. THIS ROUTINE SHOULD BE UNIVERSAL OVER ALL"
"       THE LOCAL PROCESSORS. FOR HARDWARE LEVEL 30004 COUNTER BOARD"

RAMADD: BEGIN;
*
        LDA     #$2             ;USE SHFTR: START AT SECOND BIT FOR JT1
        STA     SHFTR
        LDA     #$0
        STA     OUTAB           ;THIS IS THE INDIRECT OUTPUT ADDRESS
        LDA     #$90            ;THIS IS ALWAYS HIGH ORDER ADDRESS FOR COUNTERS
        STA     FREEZ+1         ;FOR FREEZE ADDRESS
        STA     POSN1+1         ;FOR LOW ORDER BYTE
        STA     POSN2+1         ;AND FOR HIGH ORDER BYTE
        LDA     WHO             ;NOW GET FREEZ
        AND     #$0E            ;SEE WHICH JOINT I AM
        BEQ     RAM3            ;NOT 1,2, OR 3
        LDA     #$02            ;THIS IS THE LOW COUNTERS FREEZE ADDRESS
        STA     FREEZ
        LDA     #$00            ;AND NOW THE COUNTER LOW ORDER ADDRESS
        STA     POSN1
        JMP     RAM1
```

```
RAM3    LDA     #$0A
        STA     FREEZ
        LDA     #$08            ;AND NOW THE COUNTER LOW ORDER ADDRESS
        STA     POSN1
        LDA     #$10            ;RESET SHFTR TO HIGH CONTERS
        STA     SHFTR
        LDA     #$30
        STA     OUTAB           ;AND THE ADDRESS IN RAM
RAM1    CLC
        LDA     OUTAB
        ADC     JOFF            ;THIS IS THE OFFSET
        STA     OUTAB
        LDA     WHO
        CMP     SHFTR
        BEQ     RAM2
        ASL     SHFTR
        INC     FREEZ           ;STEP THE FREEZE ADDRESS
        JMP     RAM1            ;KEEP ON LOOKING
RAM2    LDA     #$10
        STA     OUTAB+1         ;THESE ARE THE HIGH ORDER ADDRESSES
        LDA     POSN1           ;NOW FINSH UP COUNTER ADDRESSES
        STA     POSN2           ;POSN2 IS NEXT BYTE IN COUNTER
        INC     POSN2           ;SO INC IT BY 1
        RTS
*
        END;
```

We claim:

1. A robot apparatus comprising a manipulator arm having plural joints and respective motor means associated with said joints to move said manipulator arm to a predetermined spatial position and control means for said arm, said control means comprising respective modular microprocessor based control means for the control of said motors, microprocessor based control means for performing the mathematical computations required to control the trajectories of said arm and common modular microprocessor based coordinating control means for coordinating the activities of said other modular microprocessor based control means, a common electrical bus and accessing means including fixed internal timing means for establishing a predetermined timing cycle for accessing said bus, each of said microprocessor based control means being connected to said common bus by said accessing means, all of said microprocessor based control means being arranged to operate in parallel with one another, said accessing means providing each of said microprocessor based control means with direct periodic access to said bus during each timing cycle.

2. The apparatus of claim 1 wherein said bus is arranged to have connected thereto additional components for said apparatus by use of said accessing means.

3. The apparatus of claim 1 additionally comprising common memory means connected to said bus and serving as a depository for messages to and from said microprocessor based control means to enable intercommunication between said microprocessor based control means through said bus and said common memory means.

4. The apparatus of claim 3 wherein said microprocessor based control means which are connected to said bus are given access to said bus in serial sequence.

5. The apparatus of claim 4 wherein said bus is arranged to have connected thereto additional components for said apparatus by use of said accessing means.

6. The apparatus of claim 4 wherein none of said microprocessor based control means has to go into a wait state before having access to said bus.

7. The apparatus of claim 1 wherein said common microprocessor based coordinating control means is arranged to produce signals whenever access is to be given to another microprocessor based control means and wherein said other microprocessor based control means is arranged to produce signals when it desires access to said bus, whereupon said other microprocessor based control means is granted access to said bus by said accessing means.

8. The apparatus of claim 7 additionally comprising common memory means connected to said bus and serving as a depository for messages to and from said microprocessor based control means to enable intercommunication between said microprocess based control means through said bus and said common memory means.

9. The apparatus of claim 8 wherein said microprocessor based control means which are connected to said bus are given access to said bus in serial sequence.

10. The apparatus of claim 9 wherein said bus is to have connected thereto additional components for said apparatus by use of said accessing means.

11. The apparatus of claim 1 wherein said access is exclusive during respective time intervals.

12. The apparatus of claim 11 wherein said time intervals are sequential.

* * * * *